(12) United States Patent  (10) Patent No.: US 8,488,000 B2
Nagai  (45) Date of Patent: Jul. 16, 2013

(54) CAMERA AND METHOD FOR CONTROLLING THE SAME

(75) Inventor: Hiroyuki Nagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 11/945,016

(22) Filed: Nov. 26, 2007

(65) Prior Publication Data

US 2008/0136930 A1 Jun. 12, 2008

(30) Foreign Application Priority Data

Dec. 7, 2006 (JP) ................................. 2006-330697

(51) Int. Cl.
*H04N 7/18* (2006.01)
(52) U.S. Cl.
USPC ............................ 348/156; 348/158; 348/153
(58) Field of Classification Search
USPC .................. 345/1.1, 2.1, 2.2, 173; 348/211.1, 348/157, 159, 231.9
See application file for complete search history.

(56) References Cited

U.S. PATENT DOCUMENTS

| 7,327,385 | B2 * | 2/2008 | Yamaguchi | 348/207.1 |
| 7,417,672 | B2 * | 8/2008 | Nakajima et al. | 348/231.3 |
| 2004/0012810 | A1 * | 1/2004 | Haas et al. | 358/1.15 |
| 2005/0213147 | A1 * | 9/2005 | Minatogawa | 358/1.15 |
| 2006/0095540 | A1 * | 5/2006 | Anderson et al. | 709/217 |
| 2006/0174206 | A1 * | 8/2006 | Jung et al. | 715/751 |
| 2006/0199734 | A1 * | 9/2006 | Yamashita et al. | 503/227 |
| 2007/0035551 | A1 * | 2/2007 | Ubillos | 345/581 |
| 2007/0057866 | A1 * | 3/2007 | Lee et al. | 345/1.1 |
| 2007/0300272 | A1 * | 12/2007 | Takanezawa | 725/105 |
| 2010/0020186 | A1 * | 1/2010 | Matsui | 348/211.2 |

FOREIGN PATENT DOCUMENTS

| JP | 2004-259249 A | 9/2004 |
| JP | 2005-141652 A | 6/2005 |
| JP | 2005-346492 A | 12/2005 |
| JP | 2006-092335 A | 4/2006 |

* cited by examiner

*Primary Examiner* — Lin Ye
*Assistant Examiner* — Euel Cowan
(74) *Attorney, Agent, or Firm* — Canon USA Inc. IP Division (57) ABSTRACT

A camera receives an identifier that represents an event held at a predetermined location during a predetermined period of time, and assigns the identifier to a captured image. The camera requests another device to process an image corresponding to the identifier.

5 Claims, 7 Drawing Sheets

CAMERA AND METHOD FOR CONTROLLING THE SAME

BACKGROUND OF THE INVENTION

1. Field of the Invention

The present invention relates to cameras and methods for controlling the same.

2. Description of the Related Art

To share data items (e.g., images) generated by a plurality of users (e.g., camera users) at an identical event, the data items to be shared have been selected manually. For example, when people bring images captured at an athletic meet and hold a private screening of the images, each person selects images to be shared and uploads the selected images to the server. In such a manner, the images brought to the private screening are reproduced.

Selecting a data item from those created at different events requires comparison of attribute information, such as contents and creation times of data items, with one's memory or note, which takes a lot of time and may lack accuracy.

To cope with this disadvantage, a method for creating a data item representing an event on a server and for associating the event-representing data item with actual data items is provided (see, for example, Japanese Patent Laid-Open No. 2005-346492).

In addition, a method for automatically associating data items, handled at an identical space during an identical period of time, with each other is also provided (see, for example, Japanese Patent Laid-Open No. 2006-092335).

However, the above-cited methods undesirably require a server. For example, in the above-described example case where images are captured by parents at an athletic meet, matters, such as a person who prepares a server and a method for accessing the server, have to be settled.

SUMMARY OF THE INVENTION

An embodiment of the present invention allows images related to an event to be acquired from other devices.

According to an aspect of the present invention, a camera is provided that includes a capturing unit configured to capture an image, a receiving unit configured to receive an identifier that represents an event held at a predetermined location during a predetermined period of time, an assigning unit configured to assign the identifier received by the receiving unit to the image captured by the capturing unit, and a requesting unit configured to request another device to process an image corresponding to the identifier.

An embodiment of the present invention also allows images related to an event to be selectively provided to other devices.

According to another aspect of the present invention, a camera is provided that includes a capturing unit configured to capture an image, a first receiving unit configured to receive an identifier that represents an event held at a predetermined location during a predetermined period of time, an assigning unit configured to assign the identifier received by the first receiving unit to the image captured by the capturing unit, a second receiving unit configured to receive a request for an image corresponding to a specific identifier, and a retrieving unit configured to retrieve an image having the identifier received by the second receiving unit.

Further features of the present invention will become apparent from the following description of exemplary embodiments with reference to the attached drawings.

DESCRIPTION OF THE EMBODIMENTS

Exemplary Embodiment 1

In this exemplary embodiment, a method for sharing images captured by a plurality of users with cameras at a common event will be described. For example, the event may be a school athletic meet. The description is given for a case where parents capture images of their children at the athletic meet, and gather at one of their houses after the athletic meet to hold private screening of the captured images. It is assumed as follows: (1) an access point is installed at the school where the event is held; (2) this access point is open to the public and is capable of wirelessly communicating with cameras brought thereto by the parents; (3) a display is installed at the house where the private screening is held; and (4) this display has an access point function, is open to the public, and is capable of wirelessly communicating with cameras brought thereto by the parents.

Figure 1:
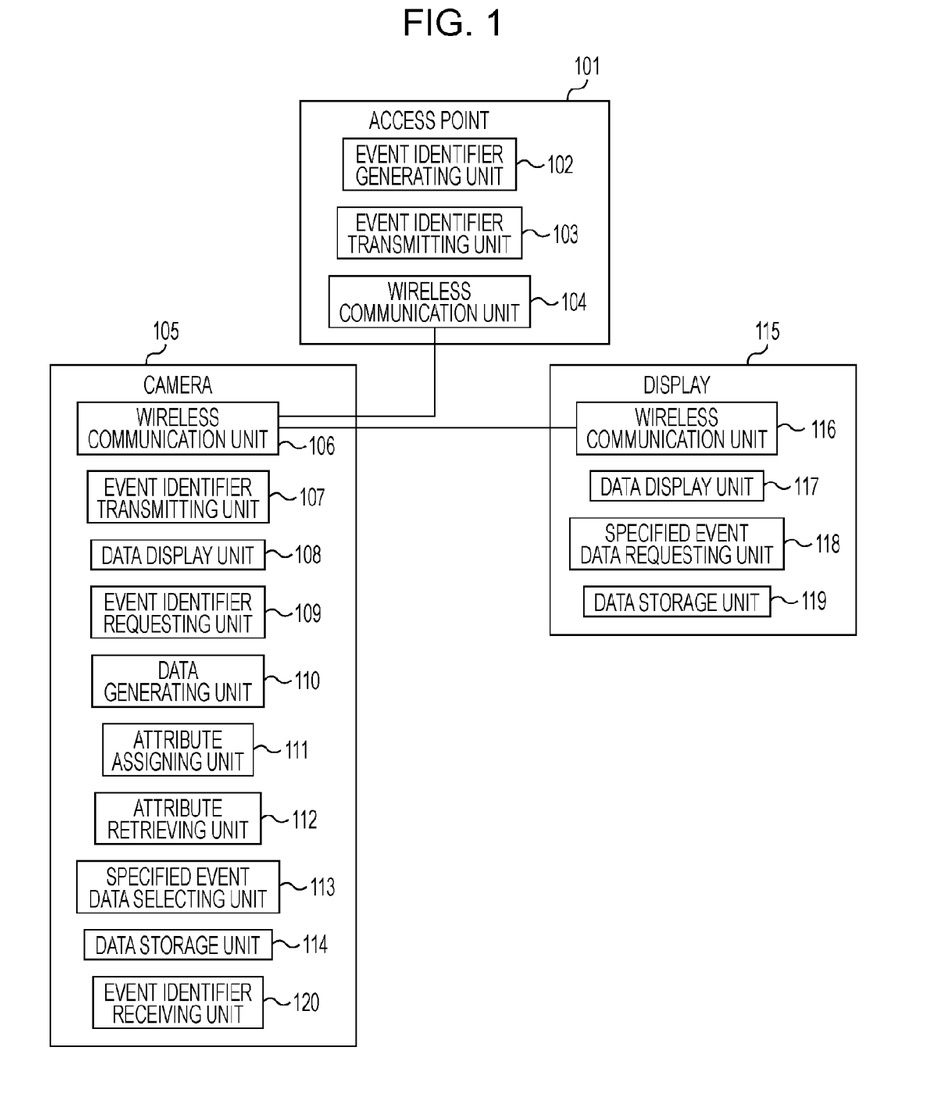
FIG. 1 is a diagram showing devices and functional blocks included in each device according to an exemplary embodiment of the present invention.

FIG. 1 shows functional blocks included in each device employed in this exemplary embodiment.

An access point (i.e., a first (data processing) device) 101 includes an event identifier generating unit 102, an event identifier transmitting unit 103, and a wireless communication unit 104.

A camera (i.e., a second device) 105 includes a wireless communication unit 106, an event identifier transmitting unit 107, a data display unit 108, an event identifier requesting unit 109, a data generating unit 110, an attribute assigning unit 111, an attribute retrieving unit 112, a specified event data selecting unit 113, a data storage unit 114, and an event identifier receiving unit 120.

A display 115 includes a wireless communication unit 116, a data display unit 117, a specified event data requesting unit 118, and a data storage unit 119.

The access point 101 generates an identifier representing an event. The camera 105 assigns the identifier to image data as attribute information thereof at the time of capturing.

The event identifier generating unit 102 generates an event identifier that indicates a period of time (i.e., a specified time interval) during which and a space (i.e., a specified spatial area) at which data (e.g. image data) is generated. The event identifier transmitting unit 103 supplies the event identifier to devices existing in the space during the period of time.

The event identifier receiving unit 120 receives the event identifier from the access point (i.e., the first device) 101. The attribute assigning unit 111 assigns the event identifier to data generated in the space during the period of time indicated by the event identifier as attribute information thereof. A manner that each function is used will be described later.

Figure 2:
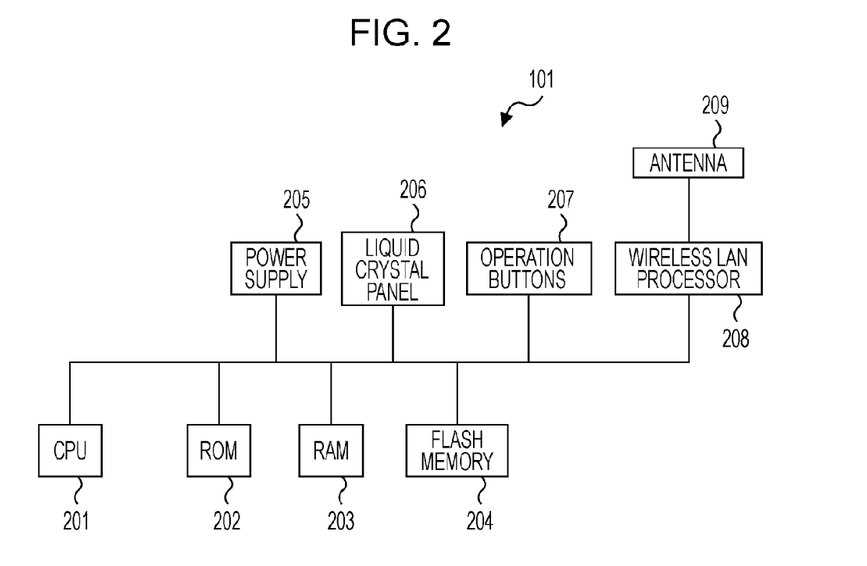
FIG. 2 is a diagram showing a hardware configuration of an access point according to an exemplary embodiment of the present invention.

FIG. 2 is a diagram showing a hardware configuration of the access point 101 according to an exemplary embodiment of the present invention.

A central processing unit (CPU) 201 controls various components of the access point 101. A read-only memory (ROM) 202 stores programs and parameters not to be changed. A random access memory (RAM) 203 temporarily stores currently executed programs and parameters used in the programs. A flash memory 204 stores basic operation programs and parameters used in the programs. In the flash memory 204, data can be written in and erased, and the content of the flash memory 204 is not lost even if the power is turned off. A power supply 205 supplies the electricity to the access point 101 from an external power source. A liquid crystal panel 206 displays information to users. Through operation buttons 207, instructions (e.g., user inputs) entered by users can be received. A wireless LAN (local area network) processor 208 enables wireless communication with other devices. The wireless LAN processor 208 allows this device to operate as an access point in a wireless LAN. An antenna 209 is used for performing wireless communication.

The CPU 201 is a computer (processor) that operates in accordance with a program stored in the ROM 202 or the flash memory 204. When the CPU 201 operates in accordance with this program, the CPU 201 of the access point 101 functions as the event identifier generating unit 102, the event identifier transmitting unit 103, and the wireless communication unit 104 shown in FIG. 1. The ROM 202 or the flash memory 204 is a storage medium from which the CPU 201 can read out this program.

Figure 3:
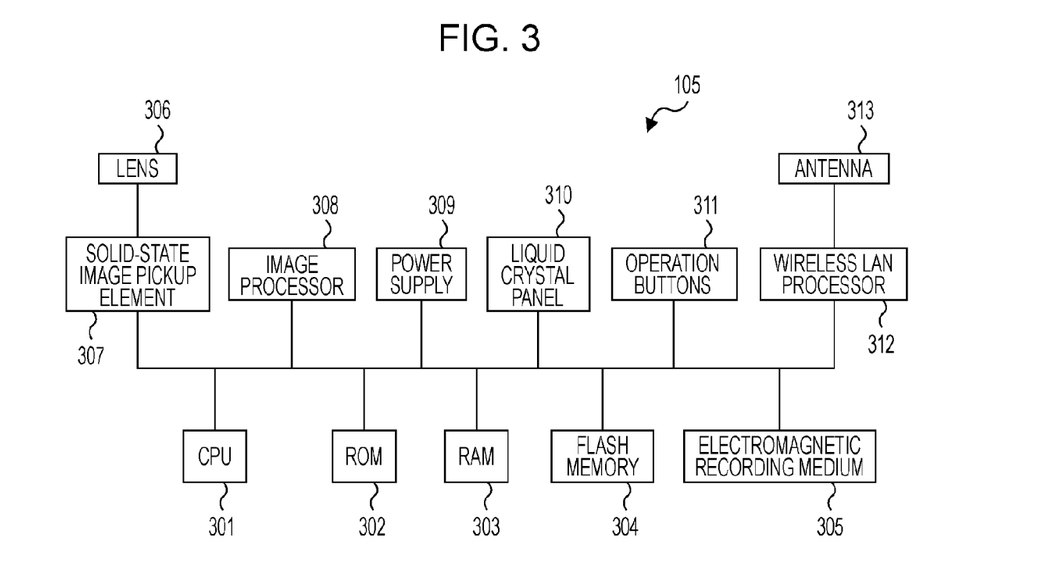
FIG. 3 is a diagram showing a hardware configuration of a camera according to an exemplary embodiment of the present invention.

FIG. 3 is a diagram showing a hardware configuration of the camera 105 according to an exemplary embodiment of the present invention.

A central processing unit (CPU) 301 controls various components of the camera 105. A read-only memory (ROM) 302 stores programs and parameters not to be changed. A random access memory (RAM) 303 temporarily stores currently executed programs and parameters used in the programs. A flash memory 304 stores basic operation programs and parameters used in the programs. In the flash memory 304, data can be written in and erased, and the content of the flash memory 304 is not lost even if the power is turned off. An electromagnetic recording medium 305 includes a fixed hard disk, a fixed memory card, or a removable memory card. A lens 306 is used for image capturing. A solid-state image pickup element 307 converts a light coming through the lens 306 into electric signals. An image processor 308 performs image processing, such as color tone correction and resolution conversion, and performs compression of image data. A power supply 309 supplies the electricity. A liquid crystal panel 310 displays information to users. Through operation buttons 311, instructions (e.g., user inputs) entered by users can be received. A shutter button is included in the operation buttons 311. A wireless LAN (local area network) processor 312 enables wireless communication with other devices. An antenna 313 is used for performing wireless communication.

The CPU 301 is a computer (processor) that operates in accordance with a program stored in the ROM 302 or the flash memory 304. When the CPU 301 operates in accordance with this program, the CPU 301 of the camera 105 functions as units 106 to 114 and 120 shown in FIG. 1. The ROM 302 or the flash memory 304 is a storage medium from which the CPU 301 can read out this program.

Figure 4:
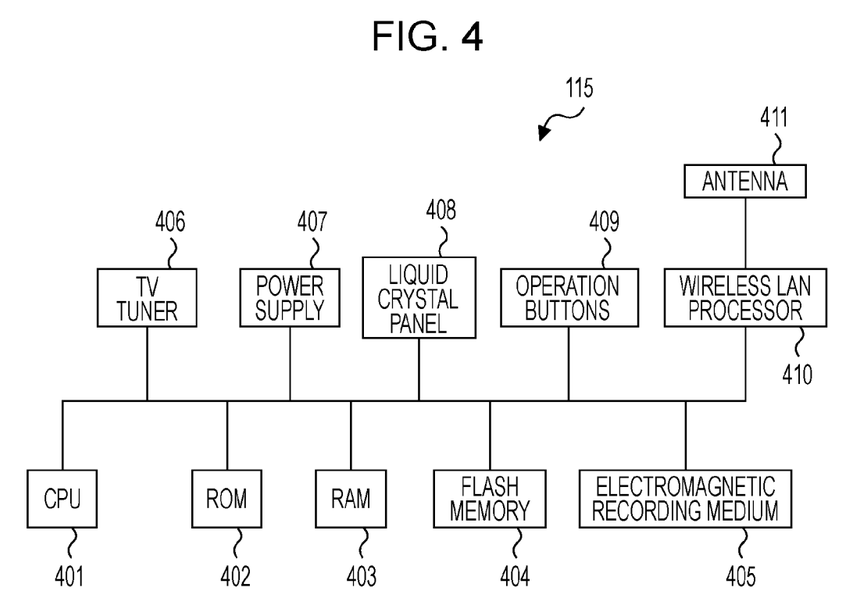
FIG. 4 is a diagram showing a hardware configuration of a display according to an exemplary embodiment of the present invention.

FIG. 4 is a diagram showing a hardware configuration of the display 115 according to an exemplary embodiment of the present invention.

A central processing unit (CPU) 401 controls various components of the display 115. A read-only memory (ROM) 402 stores programs and parameters not to be changed. A random access memory (RAM) 403 temporarily stores currently executed programs and parameters used in the programs. A flash memory 404 stores basic operation programs and parameters used in the programs. In the flash memory 404, data can be written in and erased, and the content of the flash memory 404 is not lost even if the power is turned off. An electromagnetic recording medium 405 includes a fixed hard disk, a fixed memory card, or a removable memory card. A television (TV) tuner 406 is used for receiving television broadcasting. A power supply 407 supplies the electricity to the display 115 from an external power source. A liquid crystal panel 408 displays information to users. Through operation buttons 409, instructions (e.g., user inputs) entered by users can be received. A wireless LAN (local area network) processor 410 enables wireless communication with other devices. The wireless LAN processor 410 allows this device to operate as an access point in a wireless LAN. An antenna 411 is used for performing wireless communication.

The CPU 401 is a computer (processor) that operates in accordance with a program stored in the ROM 402 or the flash memory 404. When the CPU 401 operates in accordance with this program, the CPU 401 of the display 115 functions as the wireless communication unit 116, the data display unit 117, the specified event data requesting unit 118, and the data storage unit 119 shown in FIG. 1. The ROM 402 or the flash memory 404 is a storage medium from which the CPU 401 can read out this program.

Firstly, a procedure of an event identifier generation process performed in the access point 101 will be described.

The access point 101 is managed by an event organizer, for example, a school in the case of an athletic meet. The access point 101 is installed to distribute event identifiers to cameras 105 brought thereto by parents.

An identifier corresponding to each athletic event held at the athletic meet is generated and distributed as the event identifier. Upon a user, namely, an event organizer, instructing the access point 101 to switch an event identifier using the operation buttons 207 of the access point 101, the generation process starts. This instruction is given at the time of the start of each athletic event held at the athletic meet. In response to this instruction, the access point 101 generates an event identifier. For example, a universally unique identifier (UUID) may be used as the event identifier. The UUID is generated using an algorithm that allows unique identifiers to be generated without performing any adjustments between devices. Generally, the UUID is generated using a network address of a device and the current time. The generated event identifier is stored in the flash memory 204. The event identifier generating unit 102 realizes the above-described process.

As described above, the access point 101 generates an event identifier representing a specified period of time and specified spatial area. By continuously transmitting the event identifier, generated on the basis of time and location information that can ensure the uniqueness, in a specified spatial area for a specified period of time, the event identifier can represent the specified period of time and the specified spatial area (i.e., can represent a time period and a space at which data is generated). At this time, a wireless communication coverage range corresponds to the specified spatial area.

Upon receiving an event identifier switching request given through the operation buttons 207, the access point 101 generates a new event identifier.

In the above, the description is given for a process in which an event continuously follows the previous event. However, there may be a non-event interval, such as a break, between events. In such a case, an instruction to stop the distribution of the event identifier may be given through a similar operation, or an interval, such as a break, may be handled as another event.

The UUID is used as the event identifier. However, types of event identifier are not limited to this particular example. For example, unique identifiers may be issued after making an adjustment between the access point and devices. Alternatively, unique information, such as "athletic event A in XX athletic meet", provided by users may be used as an identifier.

Figure 5:
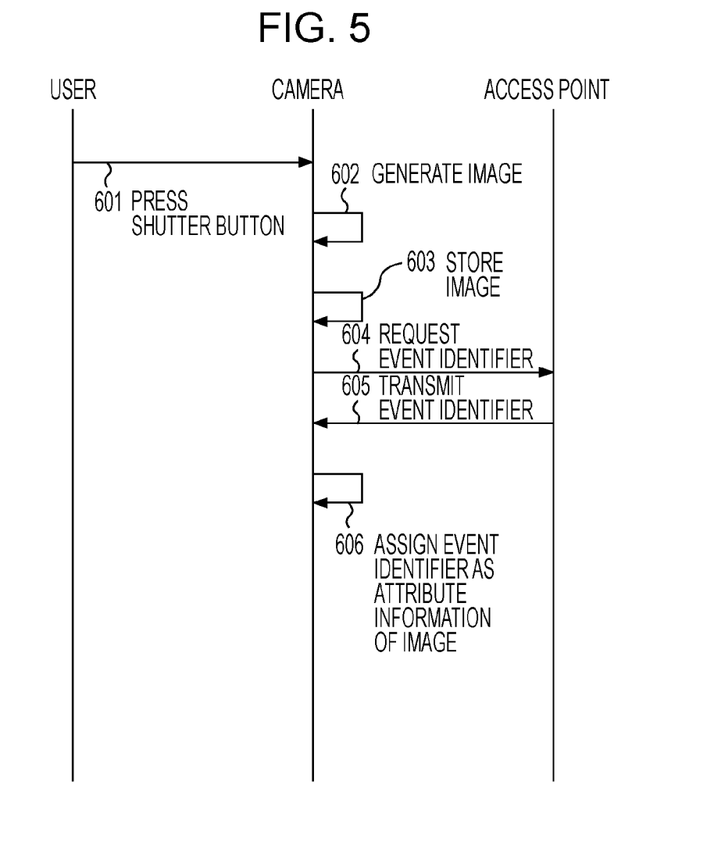
FIG. 5 is a sequence diagram showing an image generation operation performed in a camera and an access point according to an exemplary embodiment of the present invention.

FIG. 5 shows a procedure of an image generation process performed by the camera 105 and the access point 101 when a parent captures an image with the camera 105.

In response to a user's (e.g., parent's) pressing of a shutter button, which is one of the operation buttons 311 of the camera 105, the image generation process starts (STEP 601). In response to the instruction input by the user at STEP 601, the data generating unit 110 of the camera 105 generates an image (STEP 602). The data storage unit 114 then stores the image in the electromagnetic recording medium 305 (STEP 603).

The event identifier requesting unit 109 and the wireless communication unit 106 of the camera 105 then request the access point 101 to issue an event identifier through the wireless LAN processor 312 (STEP 604). In an embodiment, this request is generated and transmitted only when the access point 101 and the camera 105 can wirelessly communicate with each other, and is not executed when wireless communication is not performable. In a case where wireless communication is performable, the access point 101 transmits, in response to the request, the event identifier stored in the flash memory 204 to the camera 105 through the event identifier transmitting unit 103, the wireless communication unit 104, and the wireless LAN processor 208 (STEP 605). That is, the access point 101 transmits the event identifier to devices that exist in the space during the period of time.

Upon receiving this event identifier, the attribute assigning unit 111 of the camera 105 assigns the received event identifier to the image stored at STEP 603 as attribute information thereof (STEP 606). The above-described process allows an event at which the image is captured to be determined since the event identifier represents the time period and the space at which the data is generated.

Since event identifiers are distributed when the camera 105 and the access point 101 can communicate with each other, a space of the event corresponds to a communication coverage range.

If this communication coverage range is so narrow that a whole event space cannot be covered, a plurality of access points is arranged to cover the whole event space. In such a case, an adjustment is made between access points so as to issue an identical event identifier from different access points.

As described above, the access point 101 generates an event identifier representing a specified period of time and a specified spatial area (i.e., an event identifier representing a time period and a space at which data is generated), and transmits the event identifier to devices existing in the space during the time period at STEP 605. The camera 105 receives the event identifier, and assigns the event identifier as attribute information of data generated in the space during the time period at STEP 606.

Figure 6:
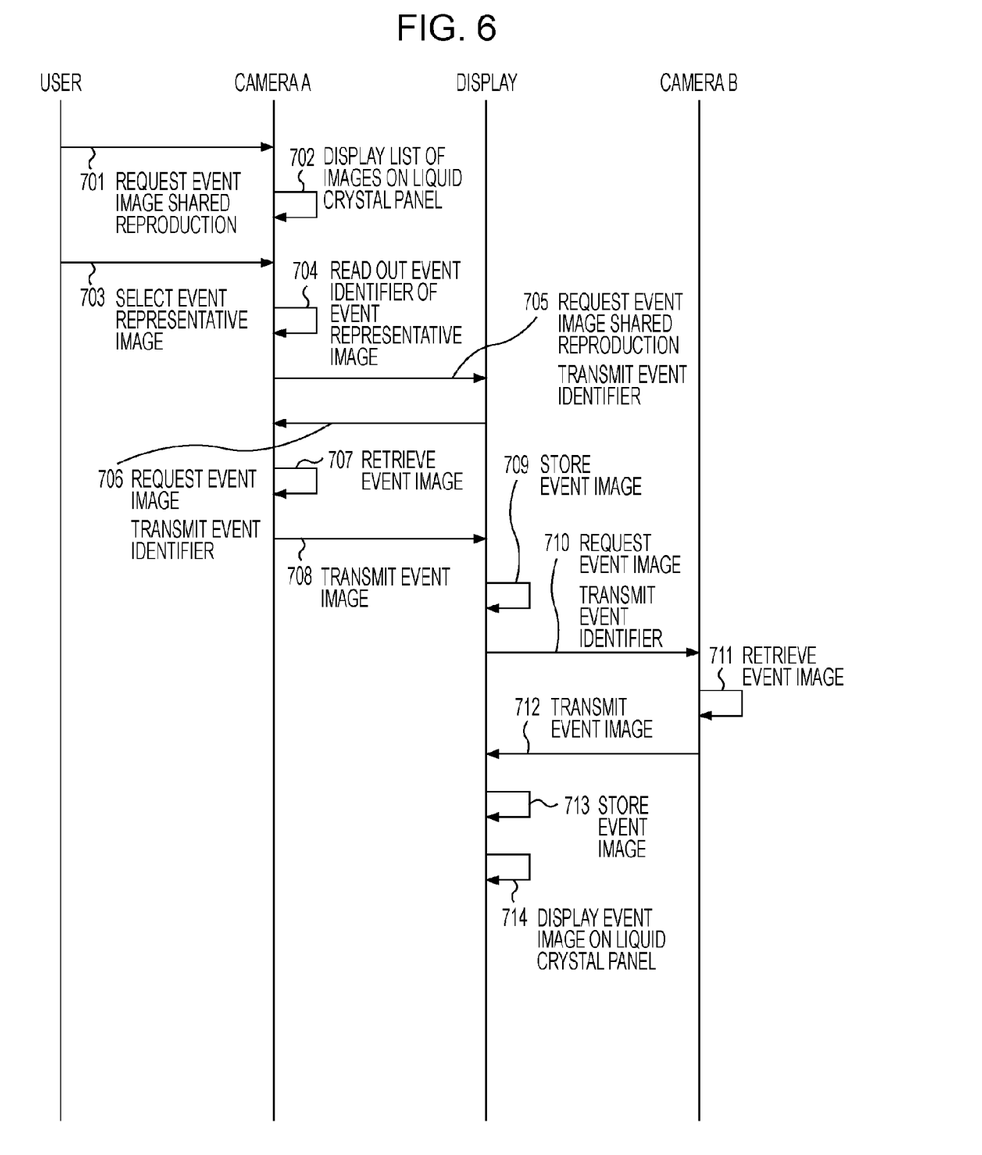
FIG. 6 is a sequence diagram showing an event-image shared-reproduction operation performed in cameras and a display according to an exemplary embodiment of the present invention.

FIG. 6 shows a procedure of a process for sharing images captured at an event and reproducing the images (hereinafter, referred to as an event-image shared-reproduction process) performed in the cameras 105 and the display 115, for example, when parents gather at one of their houses to hold private screening of the images after the athletic meet. At this time, images are reproduced on a display installed at the house. A camera brought thereto by each person functions as a storage device of images and a remote control used for transmitting operation instructions to the display.

In response to a user's (one of the parents') making a request for an event-image shared-reproduction process on their camera 105 using the operation buttons 311, this reproduction process starts (STEP 701). Upon receiving this request, the data display unit 108 of the camera 105 displays a list of images, stored in the electromagnetic recording medium 305, on the liquid crystal panel 310 (STEP 702). The user then selects an event-image to be reproduced on the displayed list using the operation buttons 311 (STEP 703). The camera 105, in turn, reads out an event identifier assigned to the selected image as the attribute information thereof (STEP 704), and instructs the display 115 to start the event-image shared-reproduction process (STEP 705). At this time, the target event is specified by transmitting the event identifier read out at STEP 704.

Upon receiving the instruction given at STEP 705, the display 115 requests all of the cameras, including the instruction-issuing camera, that exist within a communication coverage range to transmit images captured at the specified event (STEPs 706 and 710). Here, the event identifier transmitted at STEP 705 is used for specification of the event. In addition, the specified event data requesting unit 118 and the wireless communication unit 116 perform this step.

The specified event data selecting unit 113 and the attribute retrieving unit 112 of the cameras 105 that have received the request for images retrieve images having the specified event identifier from images stored in the electromagnetic recording medium 305 (STEPs 707 and 711), and transmit the retrieved images to the display 115 (STEPs 708 and 712).

The data storage unit 119 of the display 115 stores the images transmitted from the cameras 105 in the electromagnetic recording medium 405 (STEPs 709 and 713). After receiving responses from all of the cameras 105, the display 115 reads out the images stored at STEP 713. The data display unit 117 then sequentially displays the read out images on the liquid crystal panel 408 (STEP 714). Through the above-described process, images captured by a plurality of users at an identical event are reproduced on the display.

The reproduction is performed in a suitable manner using attribute information of images. For example, images are reproduced in a capturing chronological order so that users can easily know the time relationship, or images are arranged on the display in consideration of locations where the images are captured.

In the above-described manner, the camera 105 reproduces all of data items having an identical event identifier as attribute information thereof.

Figure 7:
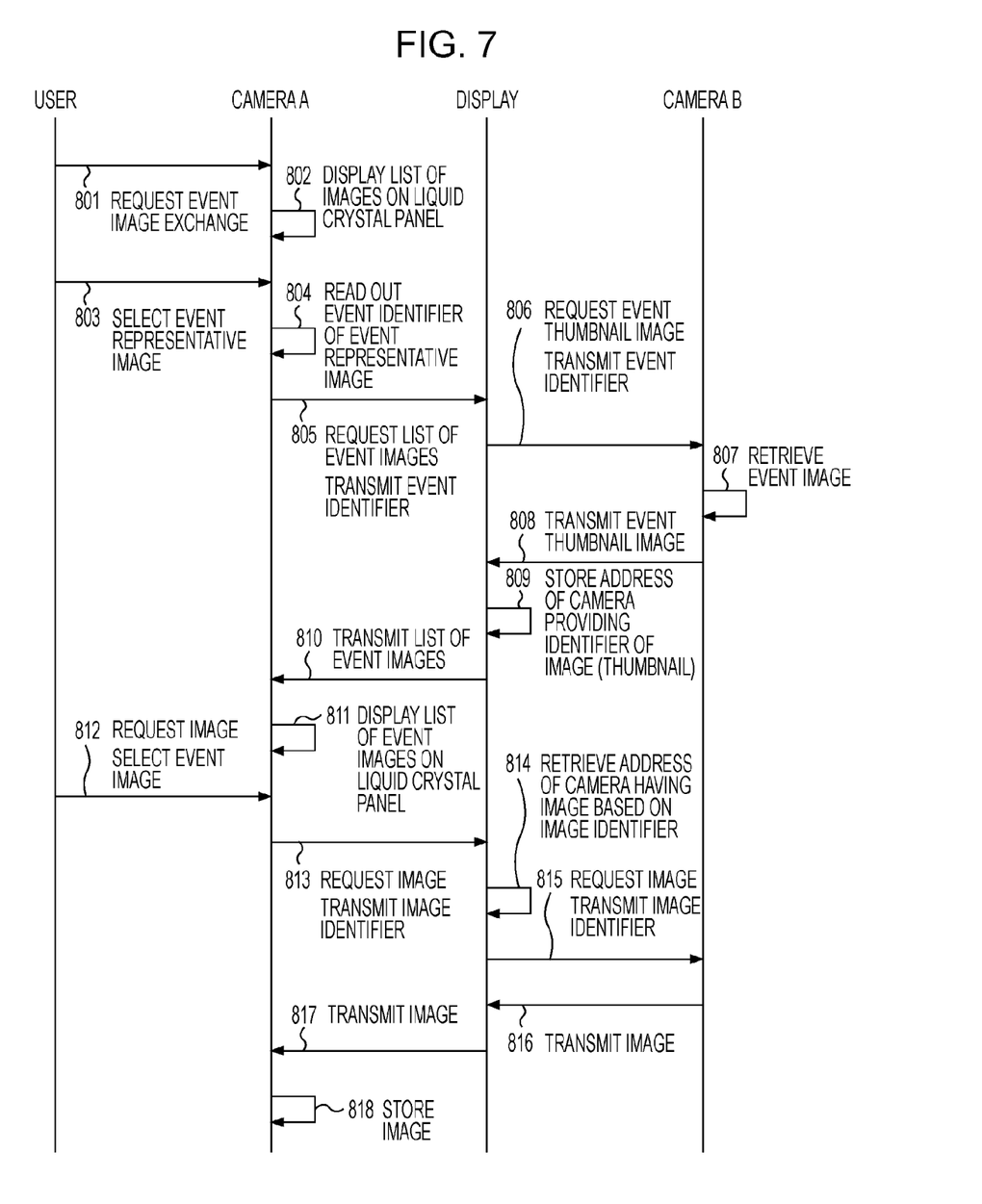
FIG. 7 is a sequence diagram showing an event-image exchange operation performed in cameras and a display according to an exemplary embodiment of the present invention.

FIG. 7 shows a procedure of an event-image exchange process performed by the cameras 105 and the display 115, for example, when parents gather at one of their houses to hold private screening of images after the athletic meet. As in the case of the above-described event-image shared-reproduction process, a display installed at the house is used. However, in the embodiment described in reference to FIG. 7, the display does not serve as a display device, but serves as a server for mediating between the cameras. A camera brought thereto by each person functions as a storage device of images, a display device for displaying images captured by other people at an identical event, and a controller used for specification of an image to be exchanged.

In response to a user's (one of parents') making a request for exchanging an event-image on their camera 105 using the operation buttons 311, this exchange process starts (STEP 801). In response to this request, the data display unit 108 of the camera 105 displays a list of images stored in the electromagnetic recording medium 305 on the liquid crystal panel 310 (STEP 802). The user then selects an event-image to be exchanged on the displayed list using the operation buttons 311 (STEP 803). The camera 105, in turn, reads out an event identifier assigned to the selected image as attribute information thereof (STEP 804), and requests the display 115 to transmit a list of event-images (STEP 805). At this time, the target event is specified by transmitting the event identifier read out at STEP 804.

Upon receiving the request transmitted thereto at STEP 805, the display 115 requests all of cameras, excluding the request-issuing one, that exist within a communication coverage range to transmit thumbnails of images captured at the specified event (STEP 806). Here, the event identifier transmitted at STEP 805 is used for specification of the event. In addition, the specified event data requesting unit 118 and the wireless communication unit 116 perform this processing step.

The specified event data selecting unit 113 and the attribute retrieving unit 112 of the cameras 105 received the request for thumbnails retrieve images having the specified event identifier from images stored in the electromagnetic recording medium 305 (STEP 807), and generate and transmit thumbnails of the retrieved images to the display 115 (STEP 808).

The display 115 temporarily stores the thumbnails transmitted from the cameras 105 in the RAM 403 or the electromagnetic recording medium 405. In addition to the thumbnails, the display 115 stores network addresses of the cameras 105 having transmitted the thumbnails and lists of image identifiers, each of which is attribute information of the corresponding thumbnail, in the electromagnetic recording medium 405 (STEP 809). After receiving responses from all of the cameras, the display 115 transmits the temporarily stored thumbnails to the request-issuing camera 105 (STEP 810). Upon receiving thumbnails transmitted at STEP 810, the camera 105 displays the received thumbnails on the liquid crystal panel 310 (STEP 811).

The user then browses thumbnails of images captured by other users at an identical event, which are displayed at STEP 811, and selects a thumbnail of an image to be acquired using the operation buttons 311 (STEP 812). In response to this user's selection, the camera 105 requests the display 115 to transmit an image corresponding to the selected thumbnail (STEP 813). Here, the image identifier, which is attribute information of the thumbnail, is used.

In response to this request, the display 115 first determines the camera storing the specified image (STEP 814). In this determination, the network addresses of the cameras and the lists of image identifiers stored at STEP 809 are used. Upon determining the camera storing the specified image, the display 115 requests the camera to transmit the specified image using the image identifier (STEP 815). The camera 105 having received the request sent from the display 115 retrieves the corresponding image from the electromagnetic recording medium 305, and transmits the image to the display 115 (STEP 816). The display 115, in turn, transfers the image to the request-issuing camera 105 (STEP 817).

The camera 105 stores the acquired image in the electromagnetic recording medium 305, thereby fulfilling the user's request (STEP 818).

Through the above-described process, images captured by a plurality of users at an identical event are exchanged. Although thumbnails of images are exchanged in order to reduce the amount of communication data in the above-described example, images may be exchanged. In other exemplary embodiments of the present invention, when a plurality of users desires to exchange an image, a processing result may be cached in the display 115 instead of performing the above-described process to improve the efficiency.

As described above, data items are shared among a plurality of devices. Here, targets of sharing are data items having an identical event identifier as the attribute information thereof.

Although communication is performed through the wireless LAN in this exemplary embodiment, other wireless communication methods, such as, for example, infrared communication, may be employed. Since each communication method has different conditions, such as a communication range, it is desirable to employ a communication method suitable for a space where an event is held for communication between an access point and cameras.

Exemplary Embodiment 2

In this exemplary embodiment, description will be given for an effective method employed in a case where it is difficult to define an event space by a communication coverage range between an access point 101 and cameras 105 unlike the exemplary embodiment 1. A case where an event space is handled more strictly than the communication coverage range corresponds to this case. This exemplary embodiment employs a modification of a procedure of an image generation process, which has been described with reference to FIG. 5. Procedures of an event-image shared-reproduction process and an event-image exchange process are common to those shown in FIGS. 6 and 7.

A hardware configuration of the access point 101 is similar to that described in the exemplary embodiment 1. Regarding a hardware configuration of the camera 105, a clock for providing the current time and a global positioning system (GPS) for providing the current position are added to the configuration shown in FIG. 3.

According to this exemplary embodiment, the access point 101 regularly, for example, every 10 minutes, transmits an event identifier to accessible cameras 105. Now, a procedure of this process will be described. The access point 101 determines whether or not a predetermined time has passed since the last transmission. If the predetermined time has passed, the access point 101 transmits an event identifier, event period information, and event space information to each camera 105. The event period information indicates a start time and an end time of the event. The event space information indicates a location where the event is held. These pieces of information are generated by an administrator of the access point 101, and are stored in the flash memory 204. The access point 101 reads out and transmits these pieces of information. As described above, the access point 101 transmits information on a specified period of time and information on a specified spatial area together with an event identifier. The camera 105 receives these pieces of information, and stores them in the flash memory 304 or the electromagnetic recording medium 305.

A procedure of an image-capturing process performed in the camera 105 will be described next. In response to a user's pressing of a shutter button of the camera 105, the camera 105 first generates an image, and stores the image. The camera 105 then compares the stored event period information with the current time to determine whether or not the current time is within the event period. If the current time is within the event period, the camera 105 compares the event space information and the current position acquired from the GPS to determine whether or not the current position is within the event space. If the current position is within the event space, the camera 105 assigns the event identifier to the image as attribute information thereof. Through the above-described process, an event identifier is assigned to an image captured by a user (or with a camera) at the event location during the event period.

Although the GPS is used for confirmation of the event space, other positioning methods may be used. For example, the position may be acquired by confirming a landmark in a captured image.

As described above, the access point 101 transmits specified time information together with an event identifier. The camera 105 receives the time information, and determines whether or not a data generation time is within a period indicated by the time information. Only when the camera 105 has confirmed that the data generation time is within the period, the camera 105 assigns the attribute. In addition, the access point 101 transmits specified spatial area information together with an event identifier. The camera 105 receives the specified spatial area information, and determines whether or not a data generation location is within the area indicated by the spatial area information. Only when the camera 105 has confirmed that the data generation location is within the spatial area, the camera 105 assigns the attribute.

Exemplary Embodiment 3

Figure 8:
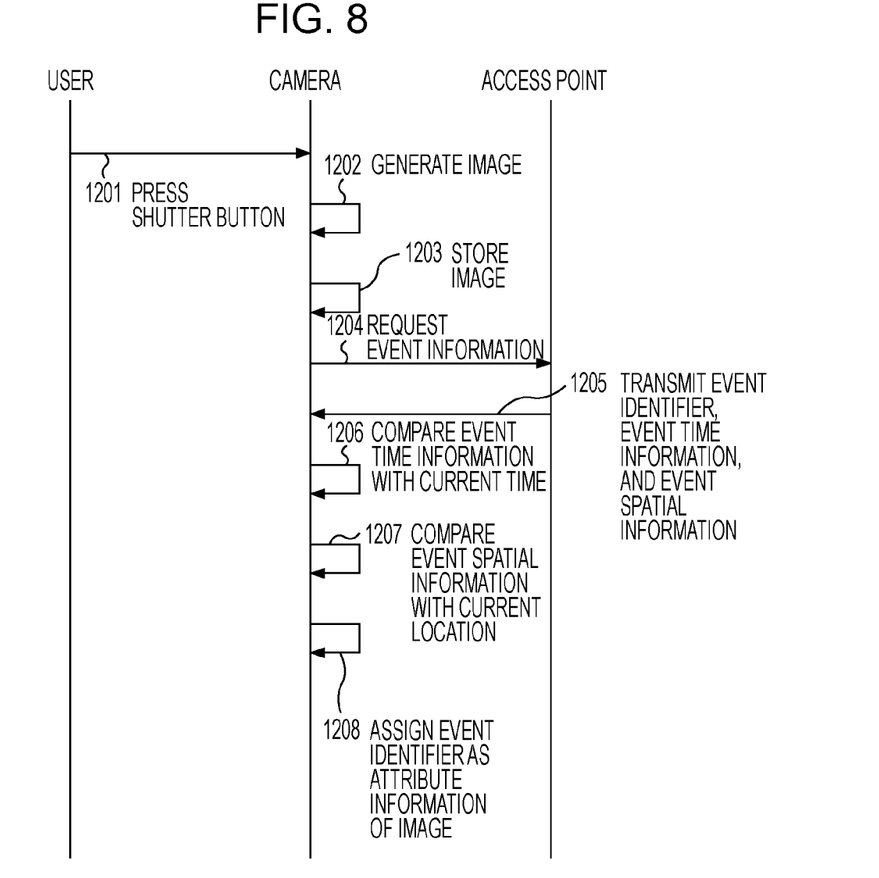
FIG. 8 is a sequence diagram showing an image generation operation according to an exemplary embodiment of the present invention.

In the exemplary embodiment 2, information regarding an event is distributed from an access point. However, the event information may be requested from cameras as in the case of the exemplary embodiment 1. FIG. 8 shows a procedure of such a case. In response to a user's pressing of a shutter button (STEP 1201), a camera first generates an image (STEP 1202), and stores the image (STEP 1203). The camera then transmits a request for event information to an access point (STEP 1204). In response to this request, the access point transmits the stored event identifier, event period information, and event space information to the camera (STEP 1205). The camera then determines whether or not the current time and the current location are within the event period and the event space, respectively (STEPs 1206 and 1207), and assigns the event identifier to the image (STEP 1208). In the method according to this exemplary embodiment, the access point and the cameras do not have to be able to perform wireless communication directly with each other. If the cameras know a network address of the access point, the communication can be realized through the Internet or the like.

Exemplary Embodiment 4

In the exemplary embodiment 1, an event identifier is assigned to images captured at a location where and during a period when an event is taking place, and the event-identifier-assigned images are treated as targets of reproduction or exchange. However, in this exemplary embodiment, a camera capable of setting images captured at an event as private images that are not related to the event will be described. The camera to be described in this exemplary embodiment has a hardware configuration similar to the one described in the exemplary embodiment 1. The camera according to this exemplary embodiment differs from the camera 105 according to the exemplary embodiment 1 in further having a private mode switching function. Users can switch the mode to a private mode using an operation button. Private mode information is stored in a flash memory.

Only an image-capturing process according to this exemplary embodiment differs from that shown in FIG. 5 described in the exemplary embodiment 1. A procedure of this image-capturing process will be described. Unlike the procedure shown in FIG. 5, after generating (STEP 602) and storing (STEP 603) an image, a camera determines whether or not the mode is set to the private mode before transmitting a request for an event identifier to the access point. If the camera determines that the mode is set to the private mode at this step, the camera does not assign the event identifier to the image. Since the image that is not attached with the event identifier is not treated as a target to be shared, the image can be set as a private image.

The private mode may be realized using a method of assigning information indicating that an image is captured under the private mode to the image as attribute information thereof instead of not assigning the event identifier. In such a case, whether or not an image is to be shared has to be determined according to the private mode information as well as the event identifier in the sharing process that will be performed later.

As described above, an event-data relationship determining step of determining whether or not a data item is related to an event represented by an event identifier is further added. Only when the data item is determined to be related to the event at the event-data relationship determining step, an attribute is assigned at an attribute assigning step. Additionally, in other exemplary embodiments, existence or absence of relationship between a generated data item and an event may be defined. At the event-data relationship determining step, the relationship between the data item and the event may be determined using the defined data-event relationship.

Exemplary Embodiment 5

In the exemplary embodiment 1, a case where a plurality of events is held at an identical location during an identical time period is not handled. However, such a case is handled in this exemplary embodiment. In particular, a case where these events are related to each other is targeted here. For example, each athletic event held at a school athletic meet is treated as the event in the exemplary embodiment 1. In this exemplary embodiment, it is considered that athletic events and an athletic meet are carried out at the same time. Similarly, it is considered that the athletic events and class athletic events, which are included in the athletic events, are carried out at the same time. "Athletic meet", "athletic event", and "class athletic event" are in a hierarchical relationship. That is, the same event is seen in a different hierarchical level. To handle such events, information on each hierarchical level may be included in an event identifier so that images can be categorized by each hierarchical level at the time of sharing of the images. A process for assigning an event identifier is similar to the one according to the exemplary embodiment 1. By allowing users to select the hierarchical level at which they desired to reproduce or exchange event-images during the sharing process shown in FIGS. 6 and 7, different hierarchy levels can be handled. In addition, at the time of reproduction, images can be reproduced after being categorized into a plurality of hierarchies. For example, "Play All" means reproduction of all images captured at "athletic meet", and "athletic event" or "class athletic event" means reproduction of images captured at "athletic event" or "class athletic event". Furthermore, event images in different hierarchical levels can be exchanged by defining an exchange rule between hierarchical levels, such as "images of events in hierarchical levels lower than the level of athletic meet are exchangeable".

Although a plurality of pieces of event information is included in one event identifier in the above description, handling of a plurality of events may be realized using a method for generating each piece of information as individual event information and assigning the plurality of pieces of information to an image. In such a case, if information on the relationship between events can be separately acquired from an access point, it is possible to perform the above-described reproduction process or the like.

For example, the access point 101 transmits event identifiers and inter-event relationship information representing a relationship between a plurality of events. The camera 105 receives the inter-event relationship information, and assigns the corresponding event identifiers and the inter-event relationship information to an image as attribute information thereof. In addition, the camera 105 associates data items having an identical event identifier as the attribute information thereof with each other and also associates data items using the inter-event relationship information, and reproduces the images. In a case where data items are shared among a plurality of devices, data items having an identical event identifier as the attribute information thereof or data items having an event identifier that is in a higher hierarchy based on the inter-event relationship information as the attribute information thereof are treated as targets of sharing.

In addition, by setting the event period and the event location to one year and all places, respectively, data items generated over the entire year can be handled as a group. Additionally, by setting the event period and the event location to infinity and a school, respectively, data items generated at the school can be handled as a group.

Exemplary Embodiment 6

The present invention is also embodied by supplying a recording medium storing software program codes for realizing functions of the above-described exemplary embodiments to a system or a device and by a computer (or a CPU or a MPU) of the system or the device reading out and executing the program codes stored on the recording medium. In such a case, the program codes read out from the recording medium realize the functions of the above-described exemplary embodiments, and the recording medium that stores the program codes constitutes the present invention.

For example, a flexible disk, a hard disk, an optical disk such as a CD (compact disk)-ROM (read only memory), a CD-R (recordable), and a DVD (digital versatile disk), a magneto-optical disk, a magnetic tape, a nonvolatile memory card, and a ROM can be employed as a recording medium for supplying the program codes.

In addition, the present invention is not limited to a case where functions of the above-described exemplary embodiments are realized by a computer executing the read out program codes. More specifically, an operating system (OS) that operates on the computer may execute some or all of the actual processing operations on the basis of instructions of the program codes, and the functions of the above-described exemplary embodiments may be realized by the processing operations. Such a case is also included in the scope of the present invention.

Moreover, the program codes read out from the recording medium may be written in a memory included in a function expansion board inserted into the computer or a memory included in a function expansion unit connected to the computer. Then, on the basis of instructions of the program codes, a CPU or the like included in the function expansion board or the function expansion unit executes some or all of the processing operations, and the functions of the above-described exemplary embodiments may be realized by the processing operations. Such a case is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-330697 filed Dec. 7, 2006, which is hereby incorporated by reference herein in its entirety.

What is claimed is:

1. A method for retrieving an image, comprising:
capturing images;
receiving an identifier of an event held at a location during a period of time;
assigning the received identifier to the captured images;
storing the captured images and the assigned identifier;
displaying a list of images stored in a first camera;
selecting an image from the list of images which is stored in the first camera and to which the identifier is assigned;
transmitting, from the first camera, the assigned identifier of the selected image to a display and the display requesting at least one other camera not including the first camera that exists within a communication coverage range to transmit from said at least one other camera a plurality of thumbnail images corresponding to the received assigned identifier of the selected image stored in the first camera;
receiving, at the display, a plurality of thumbnail images corresponding to the assigned identifier;
displaying, on a display of the first camera, the plurality of thumbnail images corresponding to the assigned identifier; and
selecting a thumbnail image of an image from the plurality of thumbnail images that are stored in a second camera corresponding to the assigned identifier, the image of the selected thumbnail image being transmitted to the first camera.

2. The method according to claim 1, wherein assigning the received identifier includes determining whether or not to assign the received identifier to the captured image on the basis of the time at which the image is captured and duration information received with the identifier for representing the period of time of the event.

3. The method according to claim 1, wherein assigning the received identifier includes determining whether or not to assign the received identifier to the captured image on the basis of the location at which the image is captured and location information received with the identifier for representing the location of the event.

4. The method according to claim 1, further comprising displaying at the first camera the image retrieved from the second camera.

5. A system comprising:

a display; and first and second cameras configured to capture images, to receive an identifier of an event held at a location during a period of time, to assign the received identifier to the captured images, to store the captured images and the assigned identifier, to display a list of images stored in the first camera, to select from the list of the images an image which is stored in the first camera and to which the identifier is assigned, and to transmit to the display from the first camera the assigned identifier of the selected image and to request from the display a plurality of thumbnail images on the second camera of the event corresponding to the received assigned identifier of the selected image stored in the first camera, wherein the display receives, a plurality of thumbnail images which are stored in the second camera and to which the identifier assigned to the image stored and selected at the first camera is assigned, and to select a thumbnail image of an image from the plurality of thumbnail images that are stored in the second camera corresponding to the assigned identifier, the image of the selected thumbnail image being transmitted to the first camera.

\* \* \* \* \*